Sept. 16, 1958          J. F. HARDY          2,852,249

MOTOR VEHICLE WINDOW OPERATING MECHANISM

Filed Oct. 10, 1956          5 Sheets—Sheet 1

J. F. HARDY
INVENTOR.

BY E. C. McRae
J. R. Faulkner
D. H. Oster

ATTORNEYS

Sept. 16, 1958 J. F. HARDY 2,852,249
MOTOR VEHICLE WINDOW OPERATING MECHANISM
Filed Oct. 10, 1956 5 Sheets-Sheet 3

J. F. HARDY
INVENTOR.

BY

ATTORNEYS

Sept. 16, 1958          J. F. HARDY          2,852,249

MOTOR VEHICLE WINDOW OPERATING MECHANISM

Filed Oct. 10, 1956          5 Sheets-Sheet 4

J. F. HARDY
*INVENTOR.*

BY *E. C. McRae*
*J. R. Faulkner*
*I. H. Oster*

ATTORNEYS

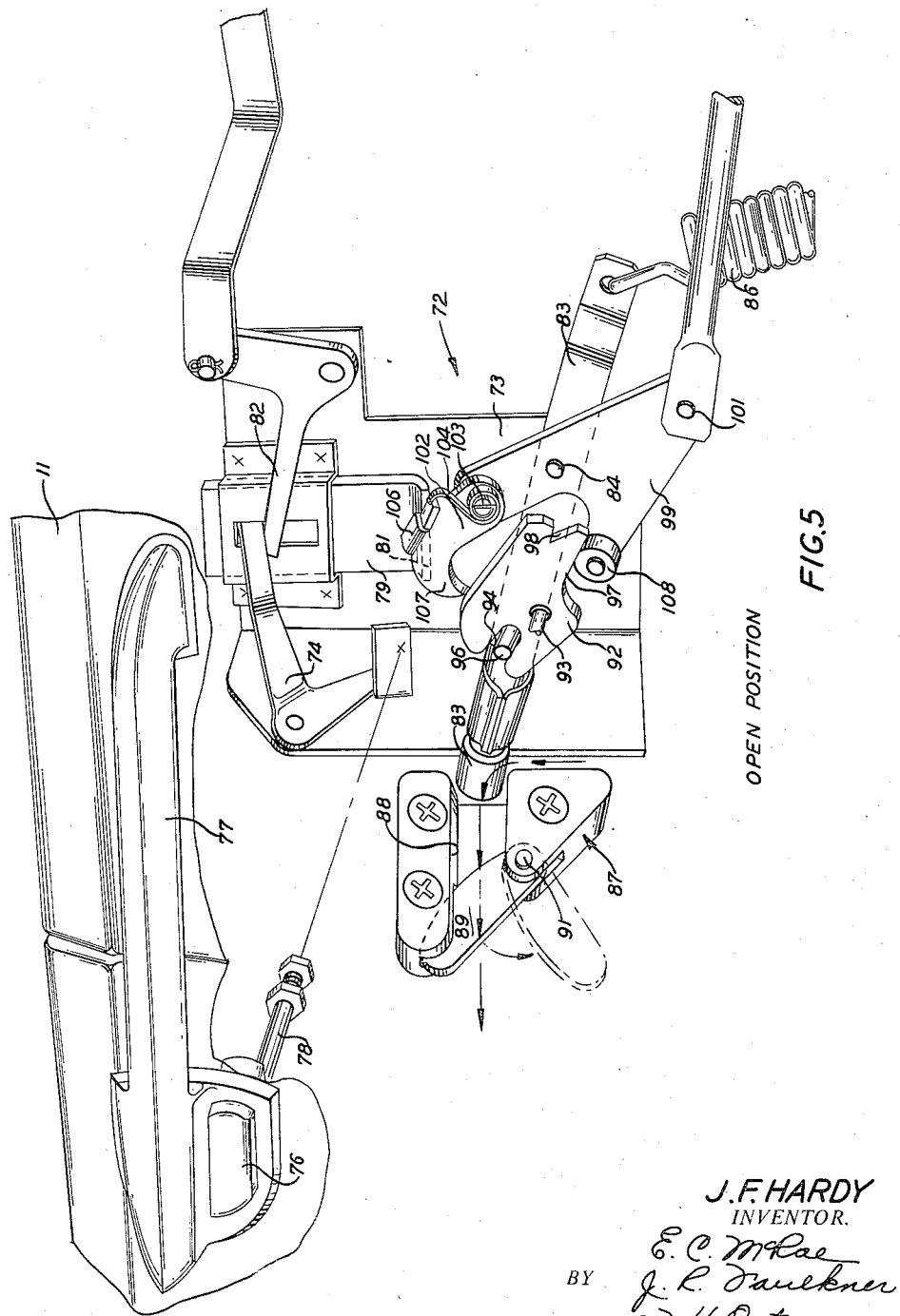

United States Patent Office 2,852,249
Patented Sept. 16, 1958

2,852,249
MOTOR VEHICLE WINDOW OPERATING MECHANISM

Joseph F. Hardy, Detroit, Mich., assignor to Ford Motor Company, Dearborn, Mich., a corporation of Delaware
Application October 10, 1956, Serial No. 615,173
11 Claims. (Cl. 268—126)

This application relates generally to motor vehicles and particularly to motor vehicle window operating mechanism.

In certain types of vehicle bodies the doors terminate at the vehicle belt line and have no rigid structure above this line. Vertically moveable windows are mounted in such doors and are raised by suitable window regulators to close the space between the door belt line and the vehicle roof structure. A weather seal must be provided between the upper portion of the window and the roof structure, and since such doors are frequently opened when the windows are completely raised, the structure at the juncture between the window and the roof structure must be such as to permit this door opening movement while at the same time maintaining a proper weather seal. This has heretofore necessitated the use of a special channel construction having a swingable outer flange or the use of special means for providing a weather seal. These structures are often expensive and not entirely satisfactory.

An object of the present invention, therefore, is to provide, in a vehicle body of the above type, window operating mechanism permitting the use of a channel construction at the roof rail for receiving the upper edge of the window glass, yet permitting the door to be opened at all times. This is accomplished by providing window operating mechanism arranged to lower the window an amount sufficient to clear the roof structure upon the operation of the door latch mechanism to open the vehicle door. In an embodiment of the invention, regulator mechanism is provided for the vehicle window which may be conveniently operated to move the window between fully raised and fully lowered positions, and auxiliary actuating means are provided and connected to the door latch mechanism in such manner as to operate the window regulator mechanism upon latch releasing movement to lower the window a predetermined amount to permit the door to be opened without interference between the window and the roof structure. The construction also automatically raises the window from its partially open position to its fully closed position when the vehicle door is again closed.

Other objects and advantages of this invention will be made more apparent as this description proceeds, particularly when considered in connection with the accompanying drawings, wherein:

Figure 5 is a view similar to Figure 4 but showing the latch mechanism in its released position, permitting the door to be opened.

Figure 6 is a view similar to Figures 4 and 5 but showing the latch mechanism at an intermediate position during its closing movement.

Figure 1:
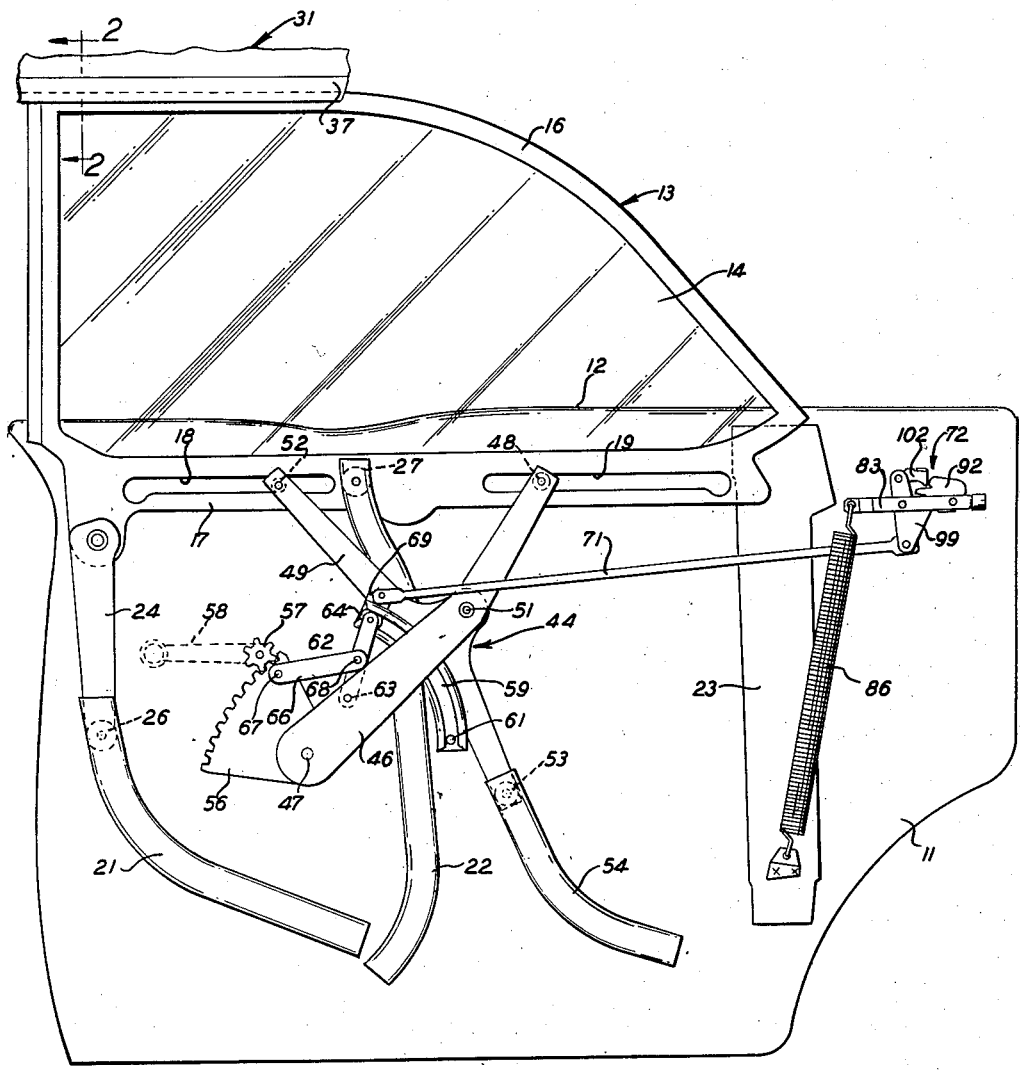
Figure 1 is a semidiagrammatic inside elevational view of window operating mechanism incorporating the present invention, with the mechanism shown in window closed position.

Referring now to the drawings, the reference character 11 indicates a motor vehicle door. The upper edge 12 of the door 11 terminates at the vehicle belt line, as in the case of the conventional hardtop type of vehicle body. A window assembly 13 is mounted for vertical sliding movement within the door 11. The window assembly 13 comprises a window glass 14 and a surrounding metal frame 16. The lower rail 17 of the window frame 16 is deeper and is formed with a pair of longitudinally spaced slotted guideways 18 and 19.

The window assembly 13 is mounted for movement within the door 11 in a compound path to afford the necessary longitudinal and vertical movement of the window necessary to clear the body pillar and other body components. The guiding means include guideways 21, 22 and 23 mounted within the vehicle door. A link 24 is pivotally connected to the forward edge of the lower frame rail 17 of the window frame and carries a roller 26 received within the guideway 21. A roller 27 is mounted on an intermediate portion of the lower rail 17 of the window assembly and is received within the guideway 22. The guideway 23 engages the sides of the window frame 16 for lateral stability.

Figure 2:
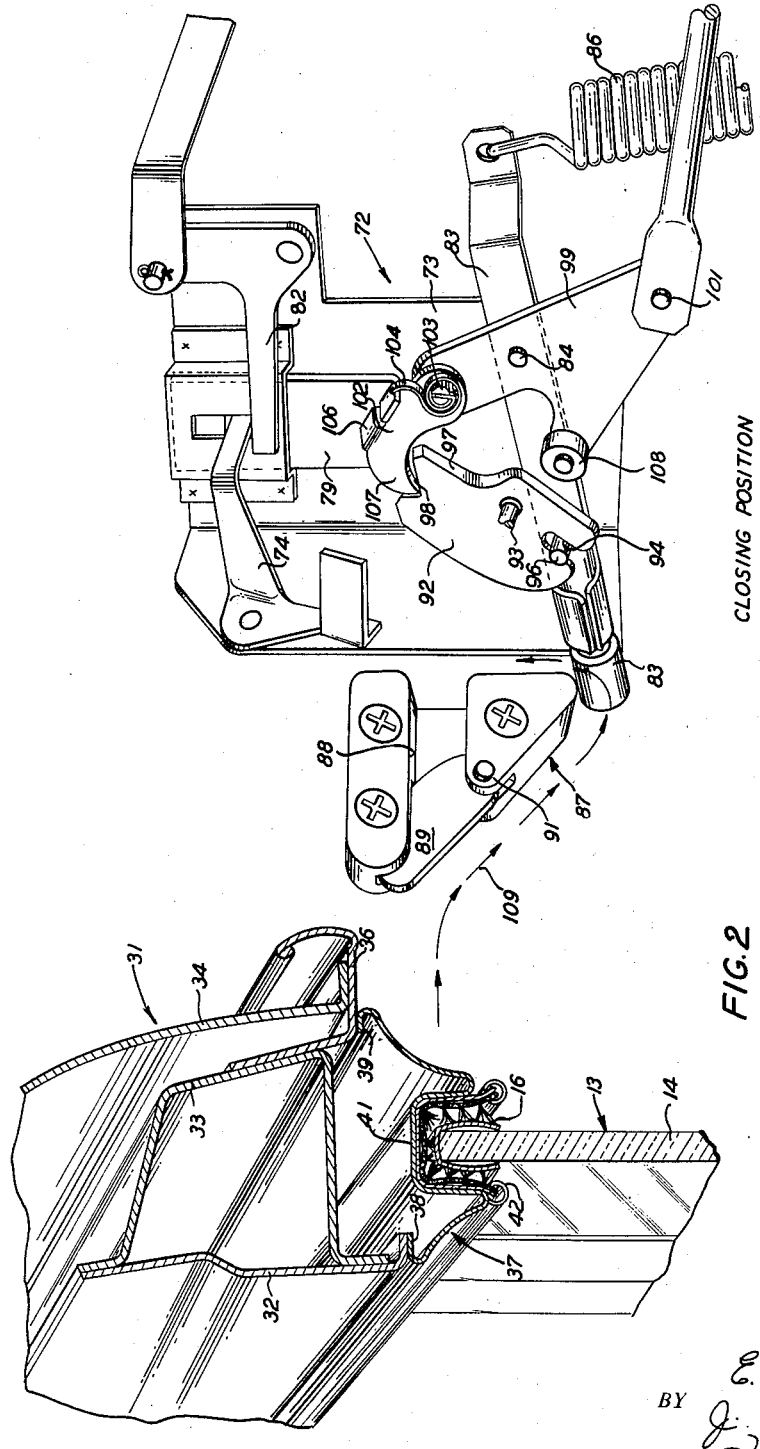
Figure 2 is an enlarged cross sectional view taken on the line 2—2 of Figure 1.

Referring now to Figures 1 and 2, the roof structure 31 of the vehicle includes a box section roof rail having a pair of welded sections 32 and 33. A drip molding 36 is secured to the roof rail section 33 and supports the roof panel 34. The lower portion of the roof rail structure is closed by a molding 37 having marginal flanges 38 and 39 secured to the roof rail section 32 and the drip molding 36 respectively. The intermediate portion 41 of the molding 37 is in the form of an inverted U-shaped channel and receives a glass run assembly 42 adapted to embrace the upper edge of the frame 16 of the window assembly 13. The molding 37 thus performs a decorative function and also provides an integral channel to receive the upper edge of the window glass to support the latter in its closed position and also to provide a weather-tight seal therebetween.

The window assembly 13 is raised and lowered by means of a regulator mechanism 44 generally of the cross arm type. A regulator arm 46 is pivoted to the door at 47 and at its opposite end carries a roller 48 received within the slotted guideway 19 in the window frame. The second regulator arm 49 is pivotally connected at 51 to an intermediate portion of the first regulator arm 46. One end of the regulator arm 49 carries a roller 52 received within the slotted guideway 18 in the window frame, and the opposite end of the regulator arm carries a roller 53 received within a curved guideway 54 mounted on the vehicle door structure. A peripherally toothed regulator sector 56 is pivotally mounted upon the door at 47 and is oscillated by means of a pinion 57 which in turn is rotated by means of an operating handle 58.

The regulator sector 56 is not directly connected to the regulator arm 46 as in the case of the conventional cross arm regulator, but instead is connected by mechanism to be described hereinafter which performs the dual function of permitting the window to be raised and lowered throughout its entire range of movement by operation of the regulator handle 58, yet which also permits the window to be raised and lowered between a fully raised position and a partially lowered position upon the opening of the vehicle door to drop the window an amount sufficient to clear the molding 37.

This mechanism includes an arcuate track 59 pivotally mounted upon the vehicle door structure at 61. A link 62 is pivotally connected at 63 to the regulator arm 46 and at its opposite end carries a roller 64 received within the pivoted track 59. A second link 66 is pivoted at 67 to the regulator sector 56 and at 68 to an intermediate portion of the first link 62. The free end of the pivoted track 59 carries a flange 69 to which is pivotally connected an actuating rod 71 connected to the door latch mechanism 72 as hereinafter described.

With the swinging track 59 held in the position shown in Figure 1, the arcuate track 59 is positioned so that its center of curvature coincides with the pivotal axis 47 of the regulator arm 46 and regulator sector 56. The interconnected links 62 and 66 form a connection between the sector and the regulator arm so that pivotal movement of the sector 56 by the pinion 57 is effective to swing the regulator arm 46 about its pivot 47, the roller 64 on the link 62 moving within the track 59 during this regulator movement. Under these conditions the regulator arms 46 and 49 operate conventionally and raise and lower the window assembly 13 in a path determined by the guideways previously described. The window assembly may be thus raised and lowered throughout its entire range of movement between its fully open and fully closed positions.

Figure 3:
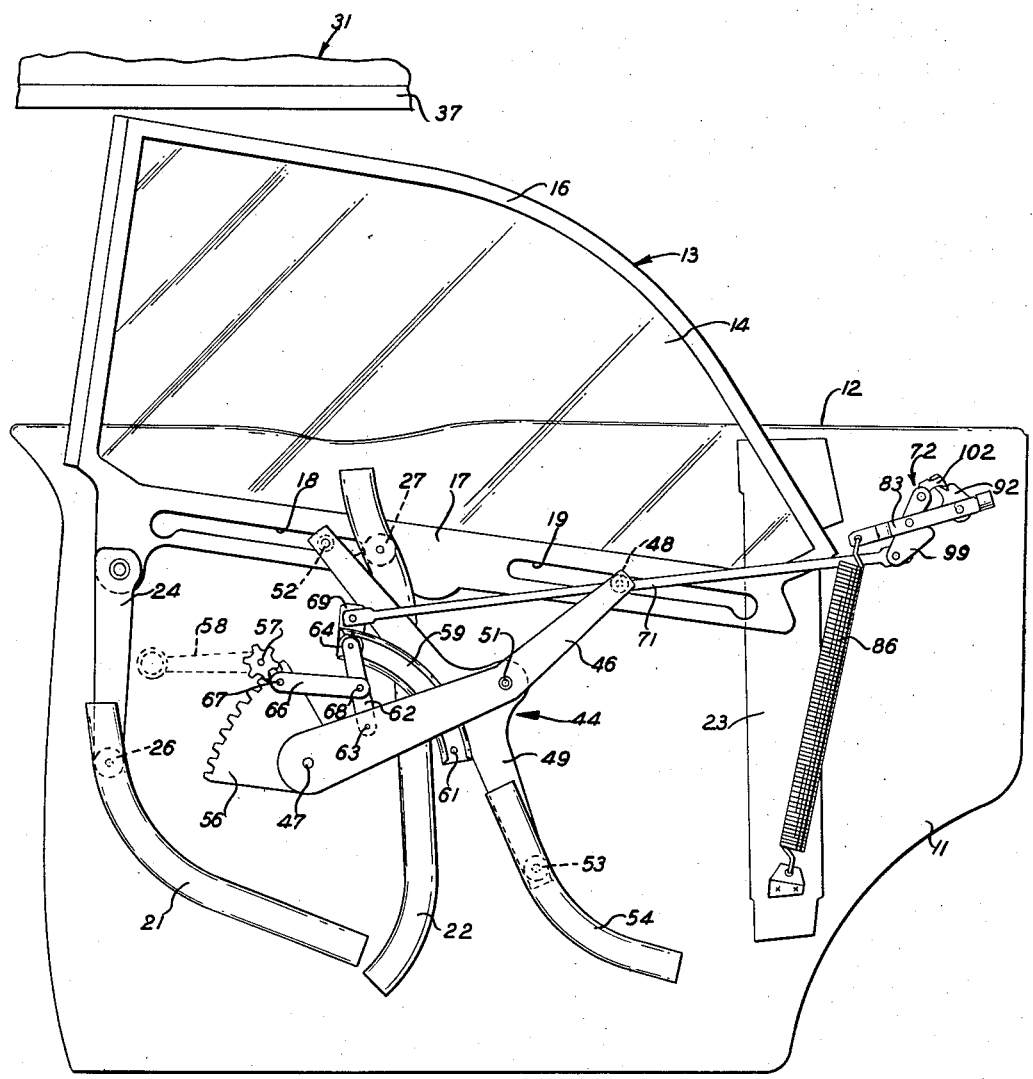
Figure 3 is a semidiagrammatic elevational view similar to Figure 1 but showing the mechanism in its position with the window partially lowered.

The latch mechanism 72 provides means for shifting the position of the pivoted track 59 from that shown in Figure 1 to that shown in Figure 3 when the door latch is operated to automatically drop the window assembly 13 to the position shown in Figure 3 in which it clears the roof structure 31 and the molding 37 carried thereby, thus permitting the door to be opened.

Figure 4:
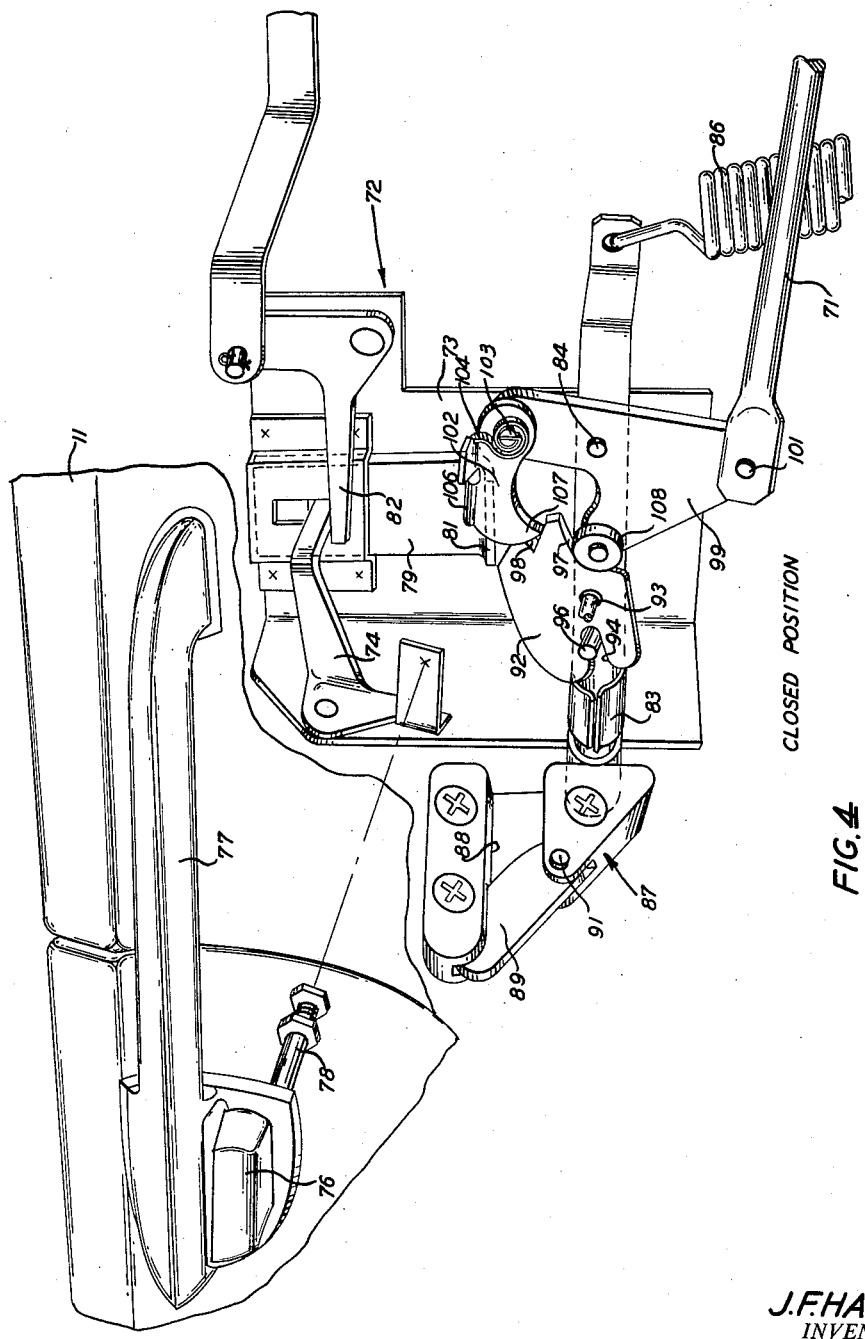
Figure 4 is a perspective view, partially broken away, of the door latch mechanism in the door closed position.

Reference is now made to Figure 4 which shows the door latch mechanism 72 in its closed position. The latch mechanism is carried upon a latch plate 73 L-shaped in cross section and secured to the vehicle door structure. A release lever 74 is pivotally mounted upon the latch plate and is adapted to be operated by a manually operable push button 76 carried within a door handle 77 mounted upon the exterior surface of the vehicle door. The push button 76 carries a plunger 78 engageable with the pivoted release lever 74 to operate the latter. A lock slide 79 is mounted for vertical sliding movement upon the latch plate 73 under the actuation of the pivoted release lever 74. The lower end of the lock slide 79 is formed with a flange 81. The lock slide 79 may be raised to unlatch the door either by the pivoted release lever 74 or by means of a remote control lever 82 pivotally mounted upon the latch plate and controlled by an inside door handle (not shown).

The door 11 is held in closed latched relationship with the vehicle body by means of a bolt 83 pivotally mounted upon the latch plate 73 by means of a pivot pin 84. A return spring 86 engages one end of the bolt 83 and the opposite end of the bolt is arranged to engage a C-shaped striker 87 mounted upon the vehicle body adjacent the edge of the door in conventional manner. The striker 87 is formed with a central groove 88 adapted to be closed by a spring urged gate 89 pivotally mounted upon the lower flange of the C-shaped striker 87 at the point 91.

The reference character 92 indicates a locking lever pivotally mounted upon a pivot pin 93 fixedly mounted upon the vehicle body. The locking lever 92 is formed with a slot 94 engaging a pin 96 carried on the bolt 83. The locking lever 92 also has a cam surface 97 formed at one edge and notched retaining portion 98 at another portion of the edge of the lever.

An intermediate lever 99 is pivotally mounted upon the pivot pin 84 and is connected by means of a pin 101 to the end of the actuating rod 71 extending to the regulator mechanism. A pawl 102 is pivotally connected at 103 to the intermediate lever 99 and is spring urged by means of a spring 104 in a counterclockwise direction. The upper edge of the pawl 102 is formed with a return bent flange 106 arranged to overlap the lower flange 81 of the lock slide 79, and is also formed with a blocking portion 107 adapted to engage the notched edge 98 of the locking lever.

*Operation*

Figure 4 illustrates the closed position of the latch mechanism and it will be noted that the bolt 83 is retained behind the lower portion of the C-shaped striker 87 to hold the door in closed or latched position. It will be seen that the pawl 102 and the locking lever 92 are in abutting relationship in this position and that the roller 108 on the intermediate lever 99 engages the cam surface 97 of the locking lever 92. The intermediate lever 99 is thus held in a position determining the normal position of the pivoted guideway 59 of the window regulator mechanism, as shown in Figure 1.

Figure 5 illustrates the position of the latch mechanism when the door handle push button 76 is operated to swing the release lever 74 in a counterclockwise direction to raise the lock slide 79. Engagement between the lower flange 81 of the lock slide and the upper flange 106 of the pawl swings the pawl 102 in a clockwise direction, releasing the retaining portion 107 of the pawl from holding engagement with the notched portion 98 of the edge of the locking lever 92. This frees the bolt 83 for pivotal movement about its pivot 84 under the action of the coil spring 86, raising the bolt to the position shown in Figure 5 in which the end of the bolt is free to pass through the horizontal groove 88 in the center portion of the C-shaped striker 87, thus enabling the door to be opened. The spring urged gate 89 in the striker readily swings out of the way as the bolt moves therethrough.

Simultaneous with this operation it will be seen that the locking lever 92 is swung in a clockwise direction about its pivot 93 by means of the engagement of the bolt pin 96 with the slot 94 in the lever. This movement results in the cam surface 97 of the lever forcing the roller 108 of the intermediate lever downwardly to swing the intermediate lever about its pivot 84 and to shift the actuating rod 71 carried thereby. This shifting movement of the actuating rod 71 swings the pivoted guideway 59 about its pivotal connection 61 to the door structure in a counterclockwise direction to the position shown in Figure 3. Since the regulator sector 56 is stationary at this time the movement of the track 59 results in a pivotal movement of the link 62 about the link 66 so as to swing the regulator arm 46 in a clockwise direction, even though the regulator sector is stationary.

This movement of the regulator arm 46 and the interconnected regulator arm 49 results in moving the window assembly downwardly to the position shown in Figure 3, withdrawing the upper portion of the frame 16 of the window assembly from the glass run 42 carried in the channel shaped section 41 of the roof molding 37. This permits the door to be readily opened.

The window may also be raised or lowered when the door is open by normal operation of the regulator handle 58, but it will be noted that the upper permitted position of the window under these circumstances is such that the window frame will clear the roof structure to permit the door to be again closed.

Figure 6 illustrates the closing movement of the door latch mechanism, and it will be seen that the bolt 83 follows the direction of the arrows 109, first engaging the gate 89 of the striker 87 and then passing around the lower portion of the striker to the latched position as shown in Figure 4. During this closing movement of the bolt 83, the retaining portion 107 of the pawl 102 engages the notched edge 98 of the lever 92 and returns the pawl 102, intermediate lever 109 and lock slide 79 to the positions shown in Figure 4, in readiness for another cycling movement. During this return movement of the intermediate lever 99, the actuating rod 71 is shifted to return the swinging guideway 59 to its original position as shown in Figure 1, again swinging the links 62 and 66 and the interconnected regulator arm 46 to raise the window assembly to its fully closed position in which the upper edge of the window frame 16 is received within the glass run carried within the channel 41 of the roof molding 37.

It will be noted that this mechanism permits the use of a channel shaped glass run assembly for the upper edge of the window frame so as to stabilize the window assembly laterally and also to form a weather-tight seal between the window and the roof. The window assembly is automatically lowered a predetermined amount when the door latch mechanism is operated to release the door so that the window assembly will clear the glass run, and the window assembly is automatically raised to its fully closed position when the door is again closed. The structure is such, however that the normal operation of the window by the window regulator is not impaired.

It will be understood that the invention is not to be limited to the exact construction shown and described, but that various changes and modifications may be made without departing from the spirit and scope of the invention, as defined in the appended claims.

What is claimed is:

1. In a motor vehicle body construction, a vehicle door for said body, latch mechanism releasably holding said door in closed position, manually operable means for releasing said latch mechanism, a window mounted in said door for generally vertical movement, regulator mechanism for raising and lowering said window, and means interconnecting said latch mechanism and said window regulator mechanism, said last named means being so arranged that actuation of said manually operable means to release said latch mechanism operates said window regulator mechanism to move said window from a closed position to a partially open position.

2. In a motor vehicle body construction, a vehicle door for said body, latch mechanism releasably holding said door in closed position, a window mounted in said door for movement between open and closed positions, regulator mechanism operatively connected to said window, actuating means connected to said regulator mechanism and operable to move said window throughout its entire range of movement between open and closed positions, and auxiliary actuating means connected to said latch mechanism, said auxiliary actuating means being also connected to said regulator mechanism and operable upon latch releasing movement of said latch mechanism to move said regulator mechanism and said window throughout a portion only of their entire range of movement.

3. The structure defined by claim 2 which is further characterized in that said actuating means and said auxiliary actuating means are independent of each other and are each connected to said regulator mechanism to operate said regulator mechanism without affecting the other of said means.

4. In a motor vehicle body construction, a vehicle door for said body, latch mechanism releasably holding said door in closed position, a window mounted in said door for movement between open and closed positions, a regulator arm pivotally mounted upon said door and operatively connected to said window, manually operable means, linkage interconnecting said manually operable means and said regulator arm to move said window throughout its entire range between open and closed positions upon actuation of said manually operable means, and auxiliary actuating means interconnecting said latch mechanism and said linkage to shift said linkage upon latch releasing movement of said latch mechanism to move said regulator mechanism and said window throughout a portion only of their entire range of movement.

5. In a motor vehicle body construction, a vehicle door for said body, latch mechanism releasably holding said door in closed position, a window mounted in said door for movement between open and closed positions, a regulator arm pivotally mounted upon said door and operatively connected to said window, manually operable means, linkage interconnecting said manually operable means and said regulator arm, guide means movably mounted upon said door and slidably engaging a portion of said linkage, and interconnecting means between said guide means and said latch mechanism to shift the position of said guide means upon latch releasing movement to move said window from closed position to a partially open position.

6. The structure defined by claim 5 which is further characterized in that said guide means comprises a track pivotally mounted upon said door and said linkage comprises a pair of links pivotally connected to each other and to said manually operable means and to said regulator arm, one of said links having a slidable connection with said track.

7. The structure defined by claim 5 which is further characterized in that said guide means comprises a track pivotally mounted upon said door and said linkage comprises a pair of links, one of said links having one end pivotally connected to said regulator arm and its opposite end slidably engaging said track, the other of said links having one end pivotally connected to said manually operable means and its opposite end pivotally connected to an intermediate portion of said one link.

8. In a motor vehicle body having a roof structure and a door, a window mounted in said door for vertical movement therein, an inverted U-shaped member on said roof structure adapted to embrace the upper edge of said window when the latter is in its fully raised position, regulator mechanism for raising and lowering said window, actuating means for operating said regulator mechanism, and auxiliary actuating means for operating said regulator mechanism independently of said first mentioned actuating means, said auxiliary actuating means operating upon initial door opening movement and final door closing movement.

9. In a motor vehicle body construction, a vehicle door for said body, latch mechanism releasably holding said door in closed position, a window mounted in said door for movement between open and closed positions, regulator mechanism mounted upon said door and operatively connected to said window to raise and lower the latter, an actuator for said regulator mechanism, means operatively connecting said actuator to said regulator mechanism, and interconnecting means between said last named means and said latch mechanism to vary the relationship between said actuator and said regulator mechanism upon latch releasing movement of said latch mechanism to effect a partial movement of said regulator mechanism without movement of said actuator to move said window from a closed position to a partially open position.

10. In a motor vehicle body construction, a vehicle door for said body, latch mechanism releasably holding said door in closed position, a window mounted in said door for movement between open and closed positions, a regulator arm pivotally mounted upon said door and operatively connected to said window, an actuator, means operatively connecting said actuator to said regulator arm and shiftable to vary the relationship between said actuator and said regulator arm, and interconnecting means between said last named means and said latch mechanism to vary said relationship upon latch releasing movement of said latch mechanism to move said regulator arm independent of movement of said actuator to move said window from a closed position to a partially open position.

11. The structure defined by claim 10 which is further characterized in that said last named means comprises a pair of pivotally connected links forming a toggle, and said interconnecting means being connected to one of said links to shift the angular relationship between said links to vary the relationship between said actuator and said regulator arm.

References Cited in the file of this patent

UNITED STATES PATENTS

| | | |
|---|---|---|
| 2,222,659 | Gouin | Nov. 26, 1940 |
| 2,788,966 | Leihsenring | Apr. 16, 1957 |